Figure 1:
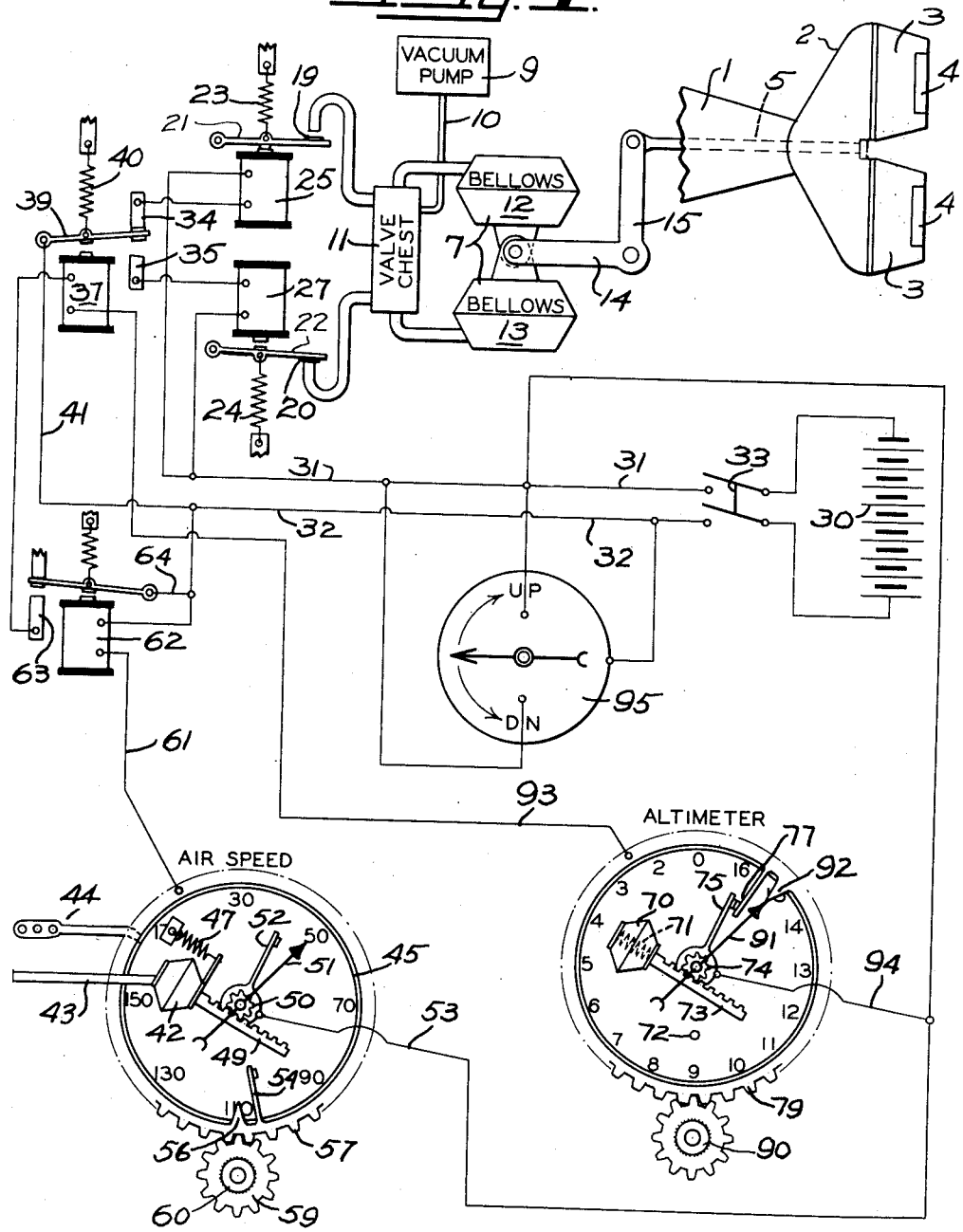

Aug. 22, 1944.    J. S. MORRISON    2,356,339
AIRPLANE PITCH CONTROL
Filed Aug. 10, 1940    2 Sheets-Sheet 1

INVENTOR,
JESS S. MORRISON.
BY
Lippincott & Metcalf
ATTORNEYS.

Aug. 22, 1944.  J. S. MORRISON  2,356,339
AIRPLANE PITCH CONTROL
Filed Aug. 10, 1940  2 Sheets-Sheet 2
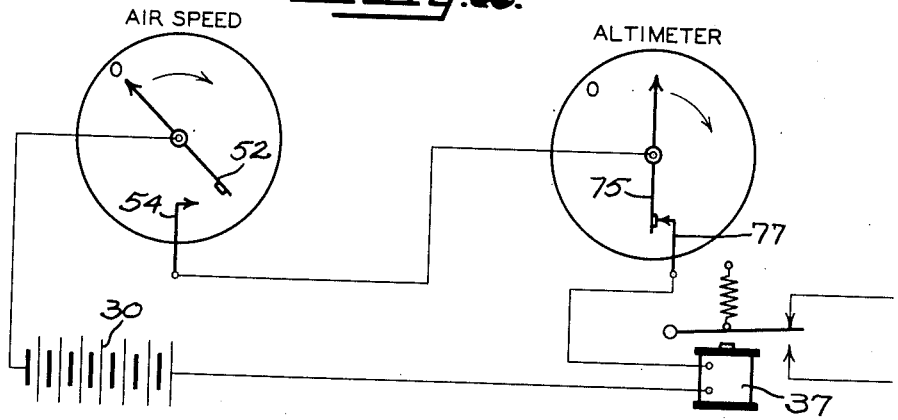
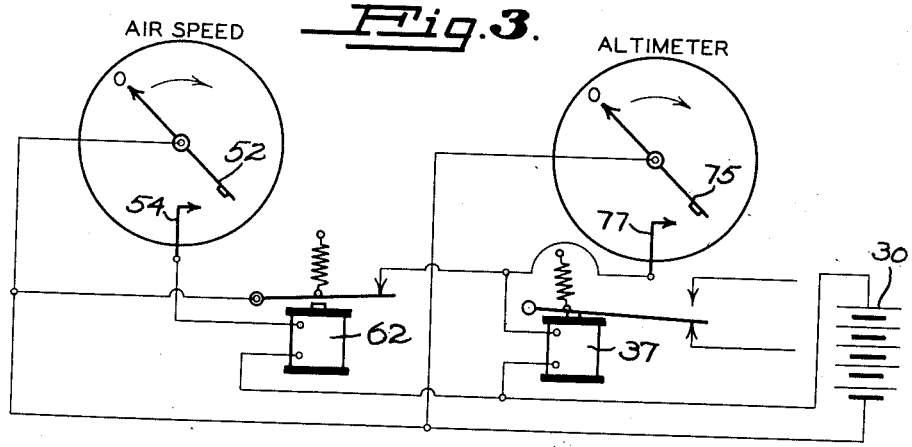
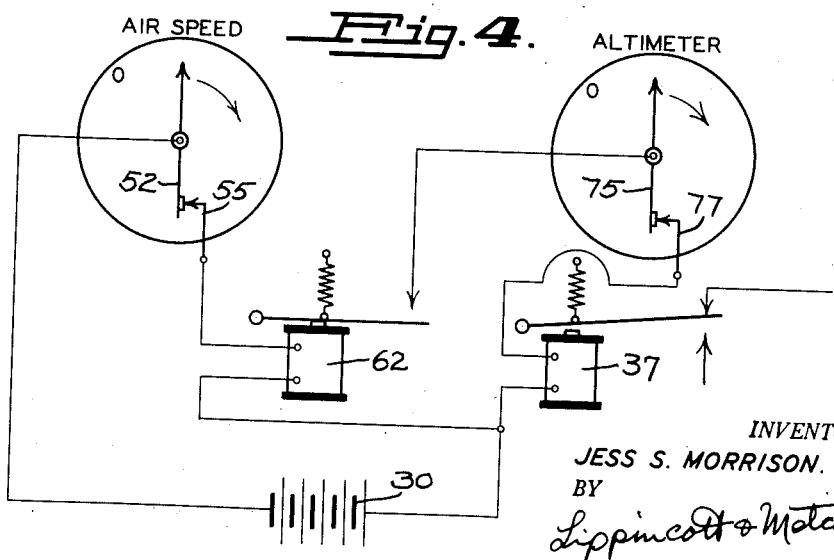
INVENTOR,
JESS S. MORRISON.
BY
Lippincott & Metcalf
ATTORNEYS Patented Aug. 22, 1944

2,356,339

UNITED STATES PATENT OFFICE 2,356,339

AIRPLANE PITCH CONTROL

Jess S. Morrison, Southgate, Calif., assignor to Leo M. Harvey, La Canada, Calif.

Application August 10, 1940, Serial No. 352,137

6 Claims. (Cl. 244—77)

This invention relates to the automatic control of aircraft, and particularly to means and methods for controlling the elevator surface or surfaces governing the pitch or angle of ascent or descent of the plane.

Among the objects of the invention are to provide a method of automatic control which will maintain a mean rate of climb for an airplane which varies with altitude so as to give at all times maximum climb or maximum flight efficiency as may be desired; to provide a method of control which will prevent the stalling of the plane; to provide a method whereby the plane can be caused to climb to a predetermined altitude and to maintain substantially that altitude thereafter without further attention; to provide a method of automatic control which will return the plane to its desired flying altitude if it be deflected therefrom by rising or descending air currents; to provide a method of control which may be used to take the plane off of the ground automatically; to provide a method of control which will automatically maintain the plane at its most economical rate of climb up to the desired ceiling or flight level and will, thereafter, permit the plane to fly at that level at increased speed; and to provide apparatus for carrying out the method above mentioned in such manner as to assure the realization of the objects set forth and which is self-monitoring so that failure of the equipment will not result in the plane stalling.

My invention possesses numerous other objects and features of advantage, some of which, together with the foregoing, will be set forth in the following description of specific apparatus embody and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

The invention is based upon the fundamental interrelation between rate of climb and indicated airspeed of a plane for any specified power delivered by the plane engine, descent being considered as negative climb. If the engine power be kept a constant, more and more of this power is devoted to the work of lifting the plane. Increasing the rate of climb therefore results in reducing the airspeed, which requires an increase in the angle of attack necessary to provide the lift, and this in turn increases drag and results in a further reduction of speed until, if the process be continued, stalling occurs. Decrease in angle of climb, on the other hand, gives increased airspeed, the power remaining constant. There is therefore, for every plane, a definite indicated airspeed representing equilibrium between any rate of power delivery and angle of climb.

Broadly considered, the method of this invention comprises utilizing the dynamic pressure developed by the airspeed of the plane to control the setting of the plane elevators, the control being applied in such sense as to lower the elevators and decrease the angle of climb when the airspeed falls below the predetermined value, and to raise the elevators and increase the angle of climb when the airspeed rises above this value. The method also involves applying the variation of atmospheric pressure with altitude to modify effect of airspeed, so that where the barometric pressure falls below a predetermined limit the effect of increased airspeed to raise the elevators and cause further climb is nullified. In the terms of appaartus, the invention comprises a servomotor for operating the elevators of the plane, means for developing a dynamic pressure differential as a result of the airspeed, and means for utilizing the pressure differential to operate the servo-motor controls. It also comprises an altimeter element which is operative to nullify the controlling action of the increased airspeed when a given indicated altitude is exceeded.

The invention may best be understood by reference to the detailed description appended to the accompanying drawings, wherein Fig. 1 is a diagram, largely schematic, illustrating a preferred embodiment of the apparatus of this invention.

Figs. 2, 3, and 4 are purely schematic diagrams showing the circuit connections of modified forms of the device.

Fig. 1 of the drawings shows in schematic form the tail of an airplane 1, carrying a horizontal stabilizer surface 2, which is, in accordance with ordinary practice, made adjustable through a slight angle, and hinged to the stabilizer are elevator surfaces 3, one or both of which are provided with trim tabs 4. A control linkage 5 raises or lowers the elevators to nose the plane up or down. Structure of this general character is utilized in all conventional planes, and all planes, conventional or unconventional, have structure which is equivalent in function to that shown. For the sake of simplicity it will be assumed throughout this specification and the claims appended thereto that the apparatus is used with controls of conventional type, and the terminology apt to the description of such controls will be used. This is not to be construed as a limitation, however, and a reference to "raising the elevators" for example is used to mean that an equivalent operation which will raise the nose of the plane and increase the angle of climb is performed, since the method and apparatus here described relate to the operation of the controls rather than to the type of control used and the method of applying the invention to unconventional types of control will be obvious to those sufficiently skilled in the art to design and operate such controls.

The control link 5 is operated by a servo-motor which is indicated generally by the reference character 7. The motor indicated in the diagram is that shown in detail in my copending application, Serial No. 372,447, filed December 31, 1940, but the form of servo-motor used is not material to this invention since many have been developed which are capable of operating any of the normal aircraft controls. The particular motor here employed is operated by atmospheric pressure. A vacuum pump 9 is connected by a pipe 10 to exhaust a valve chest 11. Valves within the chest are operated to connect either one of the two bellows 12 and 13 to the pump 9 and to open the other to the atmosphere, or, in the median position, to cut both the pump and atmosphere off from both bellows. The bellows are pivotally connected together and to one arm 14 of a bell crank whose other arm 15 connects to the link 5. Operation of the valve within the chest to connect the pump to bellows 12 will exhaust this bellows, causing the atmospheric pressure to collapse it, while bellows 13 is open and free to move, thus swinging the end of lever arm 14 upwardly as viewed in the drawings and the lever arm 15 to the right, depressing the elevators and nosing the plane down. Connecting the pump 9 to the other bellows 13 reverses this operation and raises the elevators.

Movement of the valve within the chest is accomplished by opening one or the other of the pilot valves 19 or 20. It is characteristic of the servo-motor here shown that it will operate to give continually increasing deflections, within the range of its operation, so long as either of the pilot valves is open, and, upon the closure of this valve will maintain the elevator at the setting which it has assumed until the other valve be opened. In other words, this servo-motor has no definite neutral setting to which it will return when the operating impulse ceases. It will be evident from the following description, however, that this characteristic is not an essential feature of the servo-motor used with this system, although I prefer this type.

The valves 19 and 20 are flap valves mounted on levers 21 and 22 and are normally held closed by the springs 23 and 24 respectively. The levers are the armatures of electromagnets 25 and 27. The two valves are therefore really electropneumatic relays for operating the servo-motor, and it would be possible to operate these relays directly from the controlling instruments. In order to reduce the duty of the instruments, however, the valves are themselves relay operated. They are both energized from a battery or other source 30, connecting to leads 31 and 32 through a switch 33. One end of each of the magnet coils 25 and 27 is connected to the lead 31. The other ends of these coils connect respectively to the upper and lower contact points 34 and 35 of a relay 37, whose armature 39 is normally held in contact with the upper contact point 34 by a spring 40. The armature connects in turn through a lead 41 with the other battery lead 32.

Considering the system as thus far described, which may be considered the operating portion, it will be seen that when the relay coil 37 is deenergized the contacts 34 will be closed, energizing the magnet coil 25, opening the valve 19, and operating the servo-motor to depress the elevators and cause the plane to nose down. The elevators will be applied with increasing severity so long as the valve 19 remains open. When the relay coil 37 is energized, attracting the armature 39, the contact 35 will be closed and the contact 34 opened, permitting the valve 19 to close and opening valve 20. The servo-motor will therefore be actuated in the opposite sense, raising the elevators 3 and causing the plane to nose up or increase its rate of climb. We will now turn to the control portion of the system which actuates the relay 37.

The primary control of the system is derived from an airspeed indicator movement. All airspeed indicators operate on a differential pressure or dynamic head developed by the movement of the plane through the air. Various types of apparatus have been developed for producing such pressure differentials and various types of pressure gauges have been utilized to indicate them. Any device for developing such a pressure such as a Pitot-static, Pitot-venturi, or static-venturi combination, and for operating a moving element in response thereto may be utilized in connection with my invention. The type currently in favor is that shown schematically in Fig. 1. It comprises an elastic capsule or diaphragm 42, to one side of which is connected a Pitot tube 43 and to the other side of which is connected a static head tube 44. The Pitot tube is a simple tube or pipe with an open end projecting in the direction of flight of the plane, preferably forward of and some distance away from the rest of the airplane structure so as to be subject to minimum disturbances in airflow due to such structure. The pressure developed in the Pitot tube is the barometric pressure plus the dynamic pressure due to airspeed which latter is proportional to the density of the air times the square of the velocity or airspeed. The static tube 44 may either be separate from or may surround the Pitot tube. This also comprises a tube or pipe extended in the direction of flight and in a position removed as far as possible from disturbances of flow due to the plane structure. The forward end of the static tube is, however, closed and rounded so as to avoid the formation of eddies, and air is admitted through holes or slots positioned at least one and one-half times the tube diameter from its leading end. Experiment has shown that the pressure developed in such a tube is substantially unchanged by velocity, i. e., it is equal to the barometric pressure at the point of measurement. There is therefore developed between the two tubes a pressure substantially proportional to the air density times the square of the airspeed, subject to certain second and higher order corrections.

Since the air density and velocity both enter into the expression for this pressure, the indicated velocity corresponding to any true velocity will drop as altitude increases owing to the decrease in density. Since both lift and drag are affected in accordance with substantially the same expression, however stalling will occur at substantially the same indicated airspeed irrespective of what the true speed may be, and the apparent angle of climb for optimum performance will likewise depend on the indicated speed, i. e., on the dynamic pressure or pressure differential developed on the Pitot tube.

The Pitot tube is connected to the inside of the capsule 42. The instrument is provided with an airtight case 45 into which the static tube 44 is connected. The differential pressure therefore tends to expand the capsule against the action of a return spring 47. This operates a rack 49 which meshes with a pinion 50 to rotate the shaft upon which the indicating hand 51 is mounted. The instrument as thus far described is typical, all of such instruments comprising a pressure-sensitive element, a multiplying gear, and an indicating hand. The equipment next to be described is added to this in order to effectuate the desired control.

This additional equipment comprises a contact arm 52 mounted on the instrument shaft in place of or, preferably, in addition to the hand 51. The contact arm is connected to a lead 53 which connects to lead 31 and thence to battery 30. A second contact arm 54 is mounted upon a rotatable ring carried by the case 45. This ring is preferably provided with an index pointer 56, mounted in such angular relationship to the arm 54 as to indicate the reading of the hand 51 at which contact is made. The ring is provided with gear teeth 57 meshing with a pinion 59 which may be rotated by a hand knob 60 to set the value of airspeed at which the contacts 52 and 54 are to close.

Contact 54 connects through a lead 61 with the actuating coil 62 of a normally open relay, the other end of the relay coil being connected to the lead 32. Actuation of the relay causes contact 63 to close a circuit which may be traced from lead 32 through lead 64, contact 63, relay coil 37, and thence, indirectly, back to lead 31.

There is, however, a second set of contacts included in the circuit between the relay coil 37 and the lead 32. These second contacts are operated by the altimeter. This instrument is quite similar in general principle to the airspeed meter, except for the use of a sealed evacuated capsule 70 which is compressed by barometric pressure against the action of a spring 71. The pressure effective on the capsule may either be admitted through a vent 72 in the case or, preferably, the case may be connected to the static tube. The connection of rack 73, pinion 74, contact arms 75 and 77 to the altimeter shaft and to the rotatable ring 79 respectively, differ from the corresponding parts in the airspeed meter only in the fact that the spring 71 tends to hold the contact closed in case of the altimeter instead of open as does the spring 47 in the airspeed meter. Rotation of the manual control knob 90 in the direction of increasing altitude therefore moves the altimeter index hand 91 and the pointer 92 affixed to the ring 79 together, so that the hand 91 can move to indicate altitude only when the altitude rises above that indicated by the setting of the ring pointer 92. In other words, the contacts 75 and 77 are normally closed, but open when the altitude rises above and the barometric pressure falls below that corresponding to the ring pointer setting. The contact 77 connects with the relay coil 37 through a lead 93, which the contact arm 75 connects with lead 94 and thence back to lead 31 and the battery.

From the connections thus described it follows that the circuit through relay coil 37 can be interrupted by the opening of either of two pairs of contacts, and that it can therefore be energized only when both of these contacts are closed. When the plane is at rest, and upon the ground, the altimeter contacts are closed and the airspeed contacts opened, thereby permitting relay contact 63 to open and deenergizing relay coil 37, closing the contacts 34, opening the valve 19, and setting the elevators to nose the plane down.

If now the manual control 60 be set to indicate normal takeoff speed, and the engine be speeded up as for a normal manual take-off, the servo-motor will keep the plane nose down until the airspeed rises to the predetermined value. When this point is reached the airspeed contacts will close, actuating the relay 62 and thereby the relay coil 37, closing contact 35, opening valve 20, and causing the plane to nose up and take off. With the plane once in flight and the ground resistance removed, its speed can be maintained at a higher rate of climb, and it will, accordingly, continue to increase its rate until the airspeed falls below the value set. When this occurs the airspeed meter contact opens, opening relay contacts 63 and 35 and reversing the servo-motor to depress the elevators, decrease the angle of climb, and so again increase the airspeed until the contacts again close. Once the plane is in the air opening and closing of the airspeed meter contacts occur at extremely short intervals so that the plane maintains a substantially constant average apparent angle of climb and an actual apparent angle of climb at any instant which departs only very slightly from the average. What this average angle may be is completely under the control of the pilot through the setting of the airspeed contacts.

The primary value of the device is, of course, its ability to maintain a constant optimum angle of climb rather than the ability to make an automatic take-off, although the latter ability may be of great value under certain circumstances.

When the plane has climbed to the elevation preset upon the altimeter this instrument takes charge by opening the circuit to the relay 37. When this occurs the control of the airspeed meter is nullified and even increased airspeed will not result in raising the elevators to cause further climb. The airspeed will, accordingly, rise and hold the airspeed meter contacts closed, but the circuit through the relay 37 will remain open and the elevators depressed until the plane descends below the predetermined altitude, causing the altimeter contacts to close and again raising the elevators. When this occurs the opening of the circuit may take place either through decreased airspeed or increased altitude; in practice it is the latter which occurs first, the plane continuing to fly at substantially constant altitude with very small oscillation above and below the mean.

Descent may be accomplished by a substantially similar procedure. Here the engines are ordinarily throttled back, and the airspeed meter contacts are set to give the proper airspeed for the applied power at the desired rate of descent. The altimeter contacts promptly close and the airspeed meter takes charge, alternately raising and depressing the elevators to maintain the proper or desired angle of glide. It should be pointed out, however, that the device is not intended or adapted to making automatic landings.

It is preferable that an indicator be supplied to show the direction in which the servo-motor is operating at all times. Pilot lamps in series with the coils 25 and 27 respectively may be used, or a double meter or indicator movement 95, with zero center, as shown, may be connected for this purpose.

It will at once be evident that various modifications of the apparatus are quite possible and practical. For example, the relay 62 may be entirely eliminated and the contacts 52 and 54 used directly to close the circuit to relay coil 37, as is indicated in the diagram of Fig. 2. The additional relay is used in Fig. 1 to reduce the duty imposed upon the meter contacts. On the other hand, an additional relay or relays may be inserted in cascade between the contacts 75 and 77 and the coil 37. The system as shown represents what has proved in practice to be a satisfactory compromise between maximum simplicity upon the one hand and reasonable duty upon the various contacts on the other.

It is also possible to vary the connections so as to make the airspeed meter operate to open its contacts instead of closing them, in like manner with the altimeter contacts. This involves a reversal of the relay 62, and the essentials of the connections are shown in greatly simplified form in Fig. 4. Fig. 3 is a diagram similar to Fig. 2 showing the connections which may be used where the altimeter contacts are designed to close the circuit upon reaching the desired altitude instead of opening it. It will be obvious from these examples that the circuit may be made to operate in substantially the same manner and with precisely the same effect as that shown in Fig. 1 irrespective of whether the contacts in either instrument be designed to be normally opened or normally closed, i. e., open or closed under the condition of rest at sea level.

For the sake of safety, however, the arrangement described in detail and shown in Fig. 1 is preferred, as under these circumstances the failure of the electric circuit through either instrument results in a nose-down position which assures ample flying speed for the plane and prevents its stalling. All servo-motors utilized for aircraft control may be overriden by the pilot in case of an emergency. It is, of course, highly undesirable that failure of control equipment should throw a plane into either a stall or a dive, and experiment has shown that with the equipment here described neither contingency is likely to occur. Where there is a choice, however, the former is much to be preferred and it is therefore desirable that whatever the actual relay and contact connections chosen may be, that combination will be such as to nose the plane down in case of failure.

There is, on the other hand, an advantage in using both altimeter and airspeed contacts of the normally open type as shown in Fig. 3, which is that both instruments will indicate the range between the actual condition of the plane and the point at which they will operate to depress the elevators. Actually the most convenient arrangement would be with the altimeter contacts normally open and the airspeed contacts normally closed; i. e., to indicate air speeds above the predetermined minimum and altitudes below the predetermined maximum, since the action of the apparatus is to keep the plane at all times within this range.

I claim:

1. A system for controlling the elevator of a plane to realize maximum climbing efficiency comprising a servo-motor continuously operable in either direction to full extent of its permissible movement; relay means determining continuous permissible movement of said servo-motor in one direction when said relay means is energized in one sense and determining continuous permissible movement of said servo-motor in reverse direction when energized in opposite sense; and circuit means for determining the sense in which said relay means becomes energized including an air speed pressure controlled pair of contacts, and an altitude controlled pair of contacts in series therewith.

2. A system for controlling the elevator of a plane to realize maximum climbing efficiency comprising a servo-motor continuously operable in either direction to full extent of its permissible movement; relay means determining continuous permissible movement of said servo-motor in one direction when said relay means is energized in one sense and determining continuous permissible movement of said servo-motor in reverse direction when energized in opposite sense; circuit means for determining the sense in which said relay means becomes energized including an air speed pressure controlled pair of contacts, and an altitude controlled pair of contacts in series therewith, said last pair of contacts being normally closed below a predetermined altitude; and means for predetermining the operating pressure and altitude at which each of said pairs of contacts respectively operate.

3. A system for controlling the elevator of a plane to realize maximum climbing efficiency comprising a servo-motor continuously operable in either direction to full extent of its permissible movement; relay means determining continuous permissible movement of said servo-motor in one direction when said relay means is energized in one sense and determining continuous permissible movement of said servo-motor in reverse direction when energized in opposite sense; circuit means for determining the sense in which said relay means becomes energized including an air speed pressure controlled pair of contacts which are normally open at air speeds below a predetermined value, and an altitude controlled pair of contacts in series with said first pair and being normally closed at altitudes below a predetermined altitude; and means for predetermining the operating pressure and altitude at which each of said pairs of contacts respectively operate.

4. In an airplane having an elevator, a system for controlling such elevator to realize maximum climbing efficiency comprising a servo-motor continuously operable in either direction to full extent of its permissible movement; relay means determining continuous permissible movement of said servo-motor in one direction when said relay means is energized in one sense and determining continuous permissible movement of said servo-motor in reverse direction when energized in opposite sense; circuit means for determining the sense in which said relay means becomes energized including an air speed pressure controlled pair of contacts which are normally open at air speeds below a predetermined value and with said elevator adjusted to reduce the angle of attack of said airplane, and an altitude controlled pair of contacts in series therewith and being normally closed below a predetermined altitude; and means for predetermining the operating pressure and altitude at which each of said pairs of contacts respectively operate.

5. In an airplane having an elevator, a system for controlling such elevator to realize maximum climbing efficiency comprising a servo-motor continuously operable in either direction to full extent of its permissible movement; relay means determining continuous permissible movement of said servo-motor in one direction when said relay means is energized in one sense and determining continuous permissible movement of said servo-motor in reverse direction when energized in opposite sense; and circuit means for determining the sense in which said relay means becomes energized including a pair of contacts, an airspeed pressure responsive device associated with and controlling the operation of said contacts, a second pair of contacts in series with said first mentioned pair of contacts and an altitude responsive device associated with and controlling the operation of said second pair of contacts whereby said sense determining circuit means is energizable only when said airspeed pressure responsive device and said altitude responsive device simultaneously have their associated contacts in closed condition.

6. A system for controlling the elevator of a plane to realize maximum climbing efficiency comprising a servo-motor continuously operable in either direction to full extent of its permissible movement; a circuit including a pair of relays, alternately energizable for determining the direction of movement of said servo-motor; circuit means for alternately energizing said relays in response to air speed and altitude including a pair of contacts, an air speed pressure responsive device associated with and controlling the operation of said contacts, said device being adjusted for operation of said contacts at a predetermined value of air speed, a second pair of contacts in circuit with said first pair, and an altitude responsive device associated with and controlling the operation of said second pair of contacts, said altitude responsive device being adjusted for operation of said second pair of contacts at a predetermined value of altitude.

JESS S. MORRISON.